No. 765,130. PATENTED JULY 12, 1904.
F. E. COMSTOCK.
CORN PLANTER.
APPLICATION FILED MAR. 22, 1904.
NO MODEL. 2 SHEETS—SHEET 1.
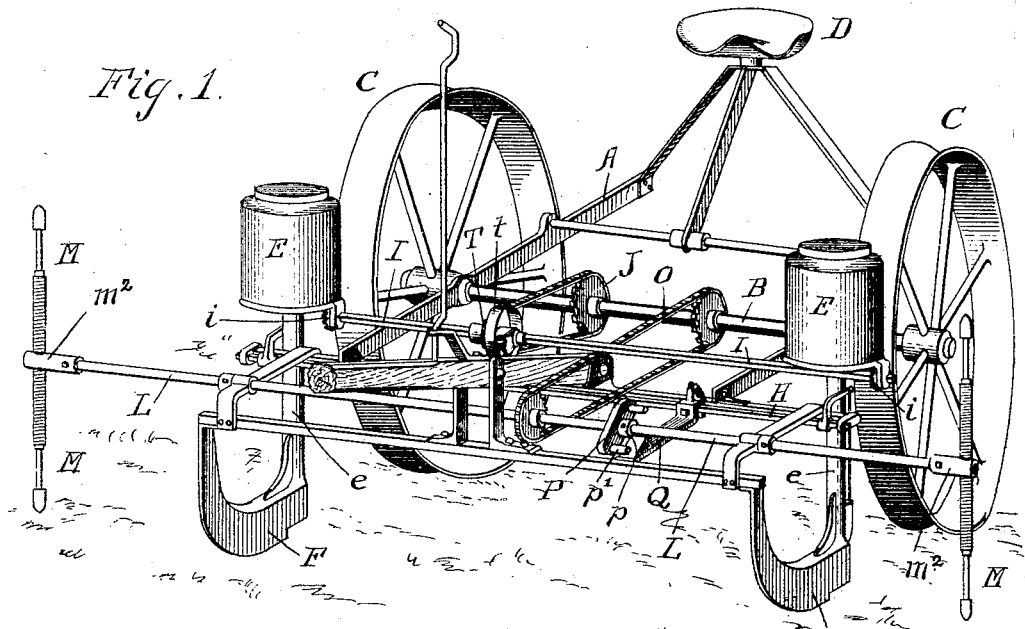
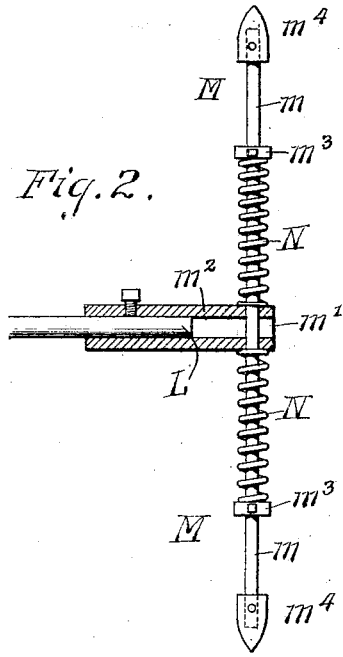
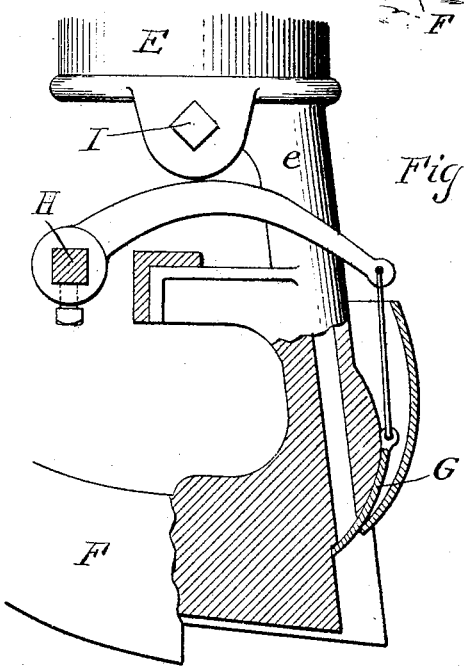
Witnesses
Ernest Pulsford
Karl Herbert Finning
Inventor
F. E. Comstock
By his Attorneys
Baldwin Davidson Wight No. 765,130. PATENTED JULY 12, 1904.
F. E. COMSTOCK.
CORN PLANTER.
APPLICATION FILED MAR. 22, 1904.
NO MODEL. 2 SHEETS—SHEET 2.
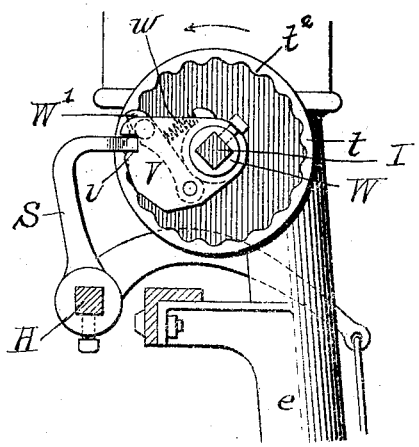
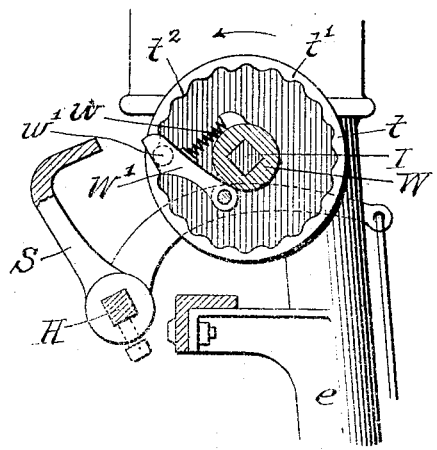
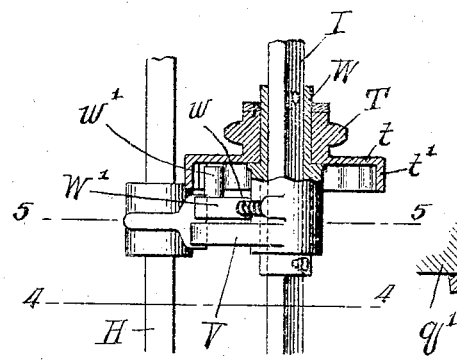
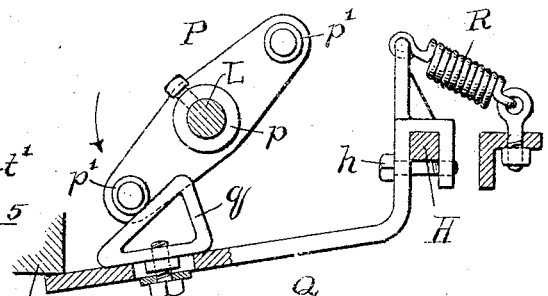
Witnesses
Ernest Pulsford.
Karl Herbert Finning
Inventor
F. E. Comstock
By his Attorneys
Baldwin Davidson Wight No. 765,130. Patented July 12, 1904.

UNITED STATES PATENT OFFICE.

FREDERICK E. COMSTOCK, OF VALPARAISO, INDIANA, ASSIGNOR OF ONE-HALF TO WALTER L. DODD, OF WESTVILLE, INDIANA.

CORN-PLANTER.

SPECIFICATION forming part of Letters Patent No. 765,130, dated July 12, 1904.

Application filed March 22, 1904. Serial No. 199,403. (No model.)

*To all whom it may concern:*

Be it known that I, FREDERICK E. COMSTOCK, a citizen of the United States, residing at Valparaiso, in the county of Porter and State of Indiana, have invented certain new and useful Improvements in Corn-Planters, of which the following is a specification.

The principal object of my invention is to produce a corn-planter in the operation of which the marking shall be done accurately by devices carried by the machine itself, dispensing with the wire and mechanism usually employed in "check-rowing."

A further object of my invention is to provide certain devices that may be attached to various kinds of corn-planters and which will enable them to operate as check-row planters without the use of wires.

In carrying out my invention I provide a marker comprising a horizontal shaft parallel with the main axle and carrying on its opposite ends arms which are adapted to make marks in the ground. Preferably two arms are arranged on each end of the shaft, and these are made yielding, so that they may operate efficiently whether the ground be level or uneven or whether or not obstructions be encountered. This marker-shaft is geared with the main axle and is operated thereby. The marker-shaft carries a dog consisting, preferably, of two arms carrying rollers, and this dog is adapted to engage with an arm projecting from a rock-shaft, which is connected with the mechanism for dropping the corn. The dog may be set at any desired position on the marker-shaft, and the arm on the rock-shaft may be correspondingly adjusted, or it may be easily removed from the rock-shaft when desired by being uncoupled and withdrawn laterally therefrom without disturbing the other parts of the mechanism. This arm may in like manner be applied laterally to the rock-shaft without disturbing the other mechanism and may be quickly coupled thereto.

In the accompanying drawings, Figure 1 is a perspective view of a corn-planter embodying my improvements. Fig. 2 is a detail view of the markers on one end of the marker-shaft. Fig. 3 is a view, on an enlarged scale, partly in section, of a valve mechanism for dropping the corn. Figs. 4 to 7, inclusive, are detail views of the devices employed for operating the shaft which drives the corn-feeding mechanism in the corn-boxes.

The frame A of the planter may be made in any suitable way, but preferably of iron, and it is supported on an axle B, provided with carrying-wheels C of usual form. The seat D is supported in the manner clearly indicated in Fig. 1. The seedboxes E have mechanism within them for periodically feeding corn through the tubes $e$ to the lower rear ends of the runners or furrow-openers F, and each of these tubes is provided with a valve G, connected in the manner shown in Fig. 3 with the rock-shaft H. These parts just described are of well-known construction. The shaft I, which carries gears $i$, engaging the mechanism in the seedboxes E, is driven from the axle B by chain-gearing J; but as the mechanism should be such as to drop the corn intermittently special provision has to be made for this purpose, and this mechanism is illustrated in Figs. 4 to 7, inclusive, and will be presently described.

The marker-shaft L is mounted in suitable bearings in the front part of the frame, although it might be located in the rear part thereof. It projects on opposite sides of the runners F and on each end carries two arms M. Preferably a single rod $m$ is used to form both arms, and this rod extends through a sleeve $m^2$, adjustably secured to the shaft L. The arms M carry collars $m^3$, between which and the sleeve $m^2$ are interposed springs N. These springs normally hold the arms in the position indicated in the drawings—namely, so that they shall extend to an equal extent from opposite sides of the shaft L; but should obstructions or inequalities be encountered the springs will yield, permitting the rod $m$ to slide through the sleeve $m^2$, but to return to their normal position after the obstructions or inequalities have been passed. Preferably enlarged heads $m^4$ are detachably connected with the outer ends of the rod $m$. The marker-shaft L is connected by chain-gearing O with the main axle B, and when the planter is in operation the shaft L is continuously revolved. Clutch mechanism might be provided for throwing the gearing O out of operation when not planting, as in going to and from the field. Such mechanism is not illustrated, as it forms no part of the present invention.

The marker-shaft L carries a dog P, preferably consisting, as shown, of two arms extending in opposite directions from the shaft L from a hub $p$ and carrying laterally-projecting pins $p'$, which may, if preferred, be provided with rollers. The dog may be slid in either direction on the shaft and held securely in any desired position thereon. It is preferably located near the center of the machine. This dog is adapted to engage an arm Q, attached to the rock-shaft H. As shown in Fig. 7, this arm is detachably connected at $h$ to the rock-shaft, and it is provided with an adjustable and removable shoe $q$, having an inclined surface with which the dog engages. The arm Q is normally held in an elevated position against a stop $q'$ by a spring R, attached to the main frame. The operation is such that as the shaft L is revolved the dog P intermittently engages the arm Q and gives a rocking motion to the rock-shaft H. This rock-shaft, as stated, is connected with the valves G, which drop the proper number of grains of corn to form the hills. The rock-shaft H also governs the movement of the shaft I and controls the delivery of corn from the boxes E into the tubes $e$. As shown in Figs. 4 and 5, the rock-shaft H carries a dog S, which is adapted to engage the clutch mechanism shown. The chain J gears with a sprocket-pinion T, formed integrally with a disk $t$, having a flanged periphery $t'$, the inner side of which is formed with a series of teeth $t^2$. The pinion T is not rigidly secured to the shaft I, but surrounds a sleeve W, which is rigidly attached to the shaft. From the sleeve W extends a plate V, formed with a notch $v$, with which the dog S is adapted to engage. To this plate is pivoted a dog W', pressed in one direction by a spring $w$ and carrying a pin or roller $w'$. When the dog S is in the notch $v$, the roller or pin $w'$ does not engage the disk $t$, and hence the pinion T and the disk $t$ may be revolved without actuating the shaft I; but when the dog S is withdrawn from the notch $v$ the pin or roller $w'$ may engage the teeth of the disk $t$, and then the shaft I will be rotated. The organization is such that the dog S is made to hold the shaft I from rotation the proper length of time to enable the planter to pass from one hill to another before feeding corn to the tubes $e$, and the organization is also such that the shaft H is operated to lift the valves G at the proper time to drop the corn.

It will be understood that the marker is actuated positively from the axle B and that a positive movement is imparted to the rock-shaft H from the axle B by the dog P and the arm Q and that the operation of the rock-shaft does not depend on any movement given to the marker-shaft L by reason of the contact of the arms M with the ground. It will also be understood that a positive movement is given to the shaft I from the axle B when the clutch is closed. The markers operate in the usual manner; but it will be observed that the use of wires is entirely avoided and that a positive movement is given to the marker-shaft from the main axle. It will be readily seen that my improvements may be applied to planters of various styles. The dog P may be adjusted to any proper position to avoid other parts of the mechanism, and the arm Q may be readily detached and applied to the rock-shaft in the proper position to coöperate with the dog.

It will be observed that the arm Q may be applied laterally to the rock-shaft or withdrawn laterally therefrom without disturbing the other parts of the mechanism, and it may be set at any desired position longitudinally on the rock-shaft.

By the arrangement of the parts the true and regular planting of corn under all conditions is provided for, even though there may be irregularities in driving.

While I have described my invention as a corn-planter, some parts thereof are useful in planting other kinds of seed.

I claim as my invention—

1. A corn-planter, comprising a main frame, wheels and axle, a marker-shaft parallel with the axle, gearing connecting the marker-shaft with the axle, a dog attached to the marker-shaft and adjustable longitudinally thereon, a rock-shaft parallel with the marker-shaft, an arm adjustable longitudinally on the marker-shaft and detachable laterally therefrom and which engages the dog on the marker-shaft, seed-feeding and seed-dropping devices, gearing connecting the seed-feeding devices with the main axle, and devices carried by the rock-shaft for controlling the feeding and dropping of the seed.

2. A corn-planter, comprising a main frame, wheels and axle, a marker-shaft, gearing directly connecting the marker-shaft with the axle, a dog secured to the marker-shaft and adjustable thereon both longitudinally and about the axis thereof, a rock-shaft parallel with the marker-shaft, an arm detachable laterally therefrom and adjustable longitudinally thereon and which engages the dog on the marker-shaft, seedboxes, seed-feeding devices therein, a shaft gearing with said feeding devices, a pulley on said shaft, gearing connecting said pulley with the axle, clutch mechanism on the seed-feeding shaft and which is adapted to gear with the pulley on said shaft, and devices on the rock-shaft for causing said clutch and pulley to engage.

In testimony whereof I have hereunto subscribed my name.

FREDERICK E. COMSTOCK.

Witnesses:
D. E. KELLY,
CHAS. A. REYNOLDS.